US012219606B2

(12) United States Patent
Lee et al.

(10) Patent No.: US 12,219,606 B2
(45) Date of Patent: Feb. 4, 2025

(54) METHOD AND APPARATUS FOR RANDOM ACCESS USING RANDOM BEAM-SWITCHING IN WIRELESS NETWORK ENVIRONMENT

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Jun Woo Won, Suwon-si (KR); Kyoung Min Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 534 days.

(21) Appl. No.: 17/479,118

(22) Filed: Sep. 20, 2021

(65) Prior Publication Data

US 2022/0095380 A1    Mar. 24, 2022

(30) Foreign Application Priority Data

Sep. 23, 2020    (KR) .................. 10-2020-0123335

(51) Int. Cl.
*H04W 74/0833*    (2024.01)
*H04W 74/0808*    (2024.01)

(52) U.S. Cl.
CPC ... *H04W 74/0833* (2013.01); *H04W 74/0808* (2013.01)

(58) Field of Classification Search
None
See application file for complete search history.

(56) References Cited

U.S. PATENT DOCUMENTS

| 7,016,649 B1* | 3/2006 | Narasimhan | H01Q 25/00 |
| | | | 455/562.1 |
| 11,284,441 B2* | 3/2022 | Guo | H04L 5/0053 |

(Continued)

FOREIGN PATENT DOCUMENTS

| KR | 10-2018-0123205 A | 11/2018 |
| KR | 10-2018-0123400 A | 11/2018 |

(Continued)

OTHER PUBLICATIONS

Won, Jun-Woo et al., "Random Access with Enhanced Beam-Switching in 5G Networks", 2020 Korean Telecommunications Society Summer Comprehensive Academic Presentation Program, 2020 (1 page in English and 4 pages in Korean).

*Primary Examiner* — Faiyazkhan Ghafoerkhan
(74) *Attorney, Agent, or Firm* — NSIP Law

(57) ABSTRACT

Disclosed are a method and apparatus for random access using random beam-switching in a wireless network environment. The random access method using random beam-switching in a wireless network environment includes selecting a given preamble when receiving a synchronization signal block from a base station, transmitting, to the base station, a first message including the selected preamble by using a sequential beam-sweeping method, transmitting a third message for a connection request for uplink data transmission when receiving, from the base station, a second message responding to the transmitted first message, and completing a random access channel operation when receiving a fourth message responding to the transmitted third message.

18 Claims, 13 Drawing Sheets

(56) References Cited

U.S. PATENT DOCUMENTS

| | | | |
|---|---|---|---|
| 11,799,618 B2* | 10/2023 | Wang | H04W 4/12 |
| 2008/0091782 A1* | 4/2008 | Jakobson | G06Q 10/10 |
| | | | 709/206 |
| 2012/0272755 A1* | 11/2012 | Ariyoshi | G16H 40/63 |
| | | | 73/866.3 |
| 2017/0231011 A1* | 8/2017 | Park | H04W 72/0446 |
| 2018/0020487 A1* | 1/2018 | Tsai | H04W 72/0446 |
| 2019/0021071 A1* | 1/2019 | Islam | H04W 74/0833 |
| 2019/0159264 A1* | 5/2019 | Zhang | H04W 24/10 |
| 2019/0364605 A1* | 11/2019 | Loehr | H04W 74/0833 |
| 2020/0059869 A1* | 2/2020 | Kim | H04W 52/50 |
| 2020/0100299 A1* | 3/2020 | Loehr | H04L 5/0094 |
| 2020/0128587 A1* | 4/2020 | Qian | H04W 56/0045 |
| 2020/0196357 A1* | 6/2020 | Park | H04W 74/006 |
| 2020/0252958 A1* | 8/2020 | Lu | H04W 4/00 |
| 2021/0306865 A1* | 9/2021 | Zhang | H04B 7/0695 |
| 2022/0046724 A1* | 2/2022 | Maso | H04W 74/0833 |
| 2022/0061107 A1* | 2/2022 | Park | H04W 74/006 |
| 2022/0095380 A1* | 3/2022 | Lee | H04W 74/0833 |
| 2022/0295570 A1* | 9/2022 | Rosa | H04W 74/0841 |
| 2023/0105766 A1* | 4/2023 | Wang | H04L 5/0055 |
| | | | 370/329 |
| 2023/0254908 A1* | 8/2023 | Park | H04W 74/0841 |
| | | | 370/329 |

FOREIGN PATENT DOCUMENTS

| | | |
|---|---|---|
| KR | 10-2019-0107151 A | 9/2019 |
| KR | 10-2020-0024215 A | 3/2020 |
| KR | 10-2020-0030536 A | 3/2020 |

* cited by examiner

| Parameter | Value | Meaning |
|---|---|---|
| $N_{UE}$ | 0~1000 | Number of UEs within section |
| $N_{Pre}$ | 54 | Number of preambles selectable by UE |
| $B_{BS}$ | 16 | Number of beams used by base station |
| $B_{UE}$ | 3~12 | Number of beams used by UE |
| L | 4 | Maximum retransmission number |
| $T_{Pre}$ | 1ms | Time taken to transmit preamble |
| $T_{BAR}$ | 1ms | Time taken to transmit RAR message |
| $T_{Msg3}$ | 3ms | Time taken to transmit Msg3 message |
| $T_{Msg4}$ | 1ms | Time taken to transmit Msg4 message |
| $T_{R-3}$ | 3ms | Time taken to transmit Msg3 from timing at which RAR response waiting time is terminated |
| $T_{PD}$ | $(B_{UE}-1)$ms | Time taken for base station to process preamble message |
| $T_{SC}$ | 2ms | Processing time taken for UE to determine beam sequence |
| $W_{BAR}$ | 4ms | RAR response waiting time |
| $W_{Msg4}$ | 32ms | Msg4 response waiting time |
| $P_{Max}$ | 23dBm | Maximum output power of UE |

FIG. 11

METHOD AND APPARATUS FOR RANDOM ACCESS USING RANDOM BEAM-SWITCHING IN WIRELESS NETWORK ENVIRONMENT

This application is based on and claims priority under 35 U.S.C. 119 to Korean Patent Application No. 10-2020-0123335 filed on Sep. 23, 2020, which is incorporated herein by reference for all purposes as if fully set forth herein

BACKGROUND OF THE INVENTION

Field of the Disclosure

The present disclosure relates to a method and apparatus for random access using random beam-switching in a wireless network environment.

Related Art

A frequency having a millimeter wave band is used in a 5G network that seeks ultra-reliable and low latency communication (URLLC). In order to overcome a high path loss of a high frequency signal, a beamforming technology is used. When considering a narrow coverage characteristic of a beam, in order to apply the beamforming technology to a network, there is a need for a beam-alignment process of finding beam angles suitable for a base station and a UE in an initial access process of the base station and the UE accessing each other.

Currently, in the 3GPP standard, in order to align beams between a base station and a UE, there are suggested a beam-sweeping technology for continuously transmitting beams for each angle and a beam-switching technology for sequentially transmitting beams depending on a condition. In an initial access procedure of a 5G network, an optimal beam angle between a base station and a UE is found in a way that a base station transmits a synchronization signal block (SSB) by using the beam-sweeping technology and the UE transmits a preamble message by using the beam-switching technology.

However, since the base station and the UE using the beam-sweeping technology and the beam-switching technology transmit the same message for each angle, the number of messages transmitted is increased and wasted energy is increased compared to the existing RACH procedure using an omni-directional antenna. Accordingly, in a network to which the beamforming technology is applied, there is a need for an efficient initial access protocol capable of reducing an access delay time and reducing a collision.

SUMMARY

Embodiments of the present disclosure are to propose a method and apparatus for random access using random beam-switching in a wireless network environment, in which a UE can efficiently access a base station by performing a random access operation by using a beam-sweeping method and a random beam-switching method in a wireless network (e.g., a 5G network) environment.

However, objects to be solved by the present disclosure are not limited to the above object, and may be variously expanded to an environment without departing from the spirit and scope of the present disclosure.

According to an embodiment of the present disclosure, there may be provided a random access method performed by a random access apparatus in a wireless network environment, including selecting a given preamble when receiving a synchronization signal block from a base station, transmitting, to the base station, a first message including the selected preamble by using a sequential beam-sweeping method, transmitting a third message for a connection request for uplink data transmission when receiving, from the base station, a second message responding to the transmitted first message, and completing a random access channel operation when receiving a fourth message responding to the transmitted third message.

The method may further include changing a new random beam sequence to be used for beam-switching and retransmitting the third message when a collision occurs in the transmitted third message.

The collision of the transmitted third message may occur because, if a plurality of user equipments (UEs) select an identical preamble and transmits the respective preambles to the base station, the base station recognizes the plurality of transmitted identical preambles as one preamble and the plurality of UEs receives one response message.

The selected preamble may have an orthogonal property and may not have a collision with another preamble transmitted at the same timing by another UE.

Transmitting the third message may include determining a random beam sequence when receiving, from the base station, the second message responding to the transmitted first message, and transmitting, to the base station, the third message for a connection request for the uplink data transmission by using a beam-switching method using the determined random beam sequence.

The beam-switching using the random sequence may include avoiding the collision of the third message by separating times when UEs transmit the third messages through uplink beams.

Transmitting the third message may include adjusting the number of beams to be used in the beam-switching method based on the number of UEs deployed in a wireless network environment.

Transmitting the third message may include transmitting the third message for a connection request for the uplink data transmission when receiving, from the base station, the second message responding to the transmitted first message.

Transmitting the third message may include receiving a resource allocated to transmit the third message through the second message received from the base station.

Completing the random access channel operation may include determining, as an uplink beam, a beam used when transmitting the third message, when receiving the fourth message responding to the transmitted third message.

According to another embodiment of the present disclosure, there may be provided a random access apparatus in a wireless network environment using random beam-switching, including a communication module communicating with a base station for a random access channel in a wireless network environment, a memory storing one or more programs, and a processor configured to execute the stored one or more programs. The processor is configured to select a given preamble when receiving a synchronization signal block from a base station through the communication module, transmit, to the base station, a first message including the selected preamble through the communication module by using a sequential beam-sweeping method, transmit a third message for a connection request for uplink data transmission through the communication module when receiving, from the base station, a second message responding to the transmitted first message, and complete a random access channel operation when receiving a fourth message responding to the transmitted third message.

The processor may be configured to determine a new random beam sequence to be used for beam-switching and to retransmit the third message through the communication module, when a collision occurs in the transmitted third message.

The collision of the transmitted third message may occur because, if a plurality of user equipments (UEs) select an identical preamble and transmits the respective preambles to the base station, the base station recognizes the plurality of transmitted identical preambles as one preamble and the plurality of UEs receives one response message.

The selected preamble may have an orthogonal property and may not have a collision with another preamble transmitted at the same timing by another UE.

The processor may be configured to determine a random beam sequence when receiving the second message from the base station and to transmit, to the base station, the third message for a connection request for the uplink data transmission through the communication module by using a beam-switching method using the determined random beam sequence.

The beam-switching using the random sequence may include avoiding the collision of the third message by separating times when UEs transmit the third messages through uplink beams.

The processor may be configured to adjust the number of beams to be used in the beam-switching method based on the number of UEs deployed in a wireless network environment.

The processor may be configured to transmit the third message for a connection request for the uplink data transmission through the communication module when receiving, from the base station, the second message responding to the transmitted first message.

The processor may be configured to receive a resource allocated to transmit the third message through the second message received from the base station.

The processor may be configured to determine, as an uplink beam, a beam used when transmitting the third message, when receiving the fourth message responding to the transmitted third message.

According to another embodiment of the present disclosure, there may be provided a random access method performed by a base station in a wireless network environment, including transmitting a synchronization signal block for random access initiation to a user equipment (UE), receiving, from the UE, a first message including a randomly selected preamble by using a sequential beam-sweeping method, transmitting, to the UE, a second message responding to the received first message, receiving, from the UE, a third message for a connection request for uplink data transmission, and transmitting, to the UE, a fourth message responding to the received third message.

The selected preamble may have an orthogonal property and may not have a collision with another preamble transmitted at the same timing by another UE.

Receiving the third message may include receiving the third message for a connection request for the uplink data transmission by using a beam-switching method using a random beam sequence determined in the UE.

The beam-switching using the random sequence may include avoiding the collision of the third message by separating times when UEs transmit the third messages through uplink beams.

Transmitting the second message may include allocating a resource for transmitting the third message by transmitting, to the UE, the second message responding to the transmitted first message.

According to another embodiment of the present disclosure, there may be provided a base station, including a communication module communicating with a user equipment (UE) for a random access channel in a wireless network environment, a memory storing one or more programs, and a processor configured to execute the stored one or more programs. The processor may be configured to transmit, to the UE, a synchronization signal block for random access initiation through the communication module, receiving, from the UE, a first message including a randomly selected preamble through the communication module by using a sequential beam-sweeping method, transmitting, to the UE, a second message responding to the received first message through the communication module, receiving, from the UE, a third message for a connection request for uplink data transmission through the communication module, and transmitting, to the UE, a fourth message responding to the received third message through the communication module.

The selected preamble may have an orthogonal property and may not have a collision with another preamble transmitted at the same timing by another UE.

The processor may be configured to receive the third message for a connection request for the uplink data transmission through the communication module by using a beam-switching method using a random beam sequence determined in the UE.

The beam-switching using the random sequence may include avoiding the collision of the third message by separating times when UEs transmit the third messages through uplink beams.

The processor may be configured to allocate a resource for transmitting the third message by transmitting the second message to the UE through the communication module.

According to another embodiment of the present disclosure, there may be provided a non-transitory computer-readable storage medium for storing instructions enabling a processor to execute a method when being executed by the processor, including selecting a given preamble when receiving a synchronization signal block from a base station, transmitting, to the base station, a first message including the selected preamble by using a sequential beam-sweeping method, transmitting a third message for a connection request for uplink data transmission when receiving, from the base station, a second message responding to the transmitted first message, and completing a random access channel operation when receiving a fourth message responding to the transmitted third message.

According to another embodiment of the present disclosure, there may be provided a non-transitory computer-readable storage medium for storing instructions enabling a processor to execute a method when being executed by the processor, including transmitting a synchronization signal block for random access initiation to a user equipment (UE), receiving, from the UE, a first message including a randomly selected preamble by using a sequential beam-sweeping method, transmitting, to the UE, a second message responding to the received first message, receiving, from the UE, a third message for a connection request for uplink data transmission, and transmitting, to the UE, a fourth message responding to the received third message.

The disclosed technology may have the following effects. However, it is not meant that a specific embodiment must include all the following effects or include only the following effects, and thus the scope of a right of the disclosed technology should not be construed as being restricted by the embodiment.

In embodiments of the present disclosure, in a wireless network (e.g., a 5G network) environment, a random access operation can be efficiently performed using the beam-sweeping method and random beam-switching method.

In embodiments of the present disclosure, a UE transmits the third message Msg3 by using the beam-switching method using a random sequence. If each UE uses beam-switching of a random sequence, the UEs may transmit the third messages Msg3 at different timing through optimal uplink beams. Accordingly, although multiple UEs have selected the same preamble, the UEs can transmit the third messages Msg3 to a base station without a collision. That is, in embodiments of the present disclosure, a collision between the third message Msg3 can be reduced because times when UEs transmit the third messages Msg3 through optimal uplink beams by using the beam-switching method using a random sequence are separated.

Furthermore, in embodiments of the present disclosure, when a collision occurs in a process of transmitting the third message Msg3, a UE may determine a new random beam sequence to be used for beam-switching, and may retransmit the third message Msg3 through new random beam switching. Accordingly, an average network access delay time of the UE can be reduced, and the number of messages transmitted by the UE and average energy consumption therefor can be reduced. That is, in embodiments of the present disclosure, when a collision occurs in the third message Msg3, a re-access operation of retransmitting the third message Msg3 through random beam switching is used instead of a conventional re-access procedure started from preamble retransmission. Accordingly, an average number of messages transmitted by a UE can be reduced.

Accordingly, in embodiments of the present disclosure, a UE can efficiently access a base station through a random access channel procedure.

BRIEF DESCRIPTION OF THE DRAWINGS

FIG. 11 is a diagram illustrating parameters used in simulations for a random access method according to an embodiment of the present disclosure.

DESCRIPTION OF EXEMPLARY EMBODIMENTS

Figure 1:
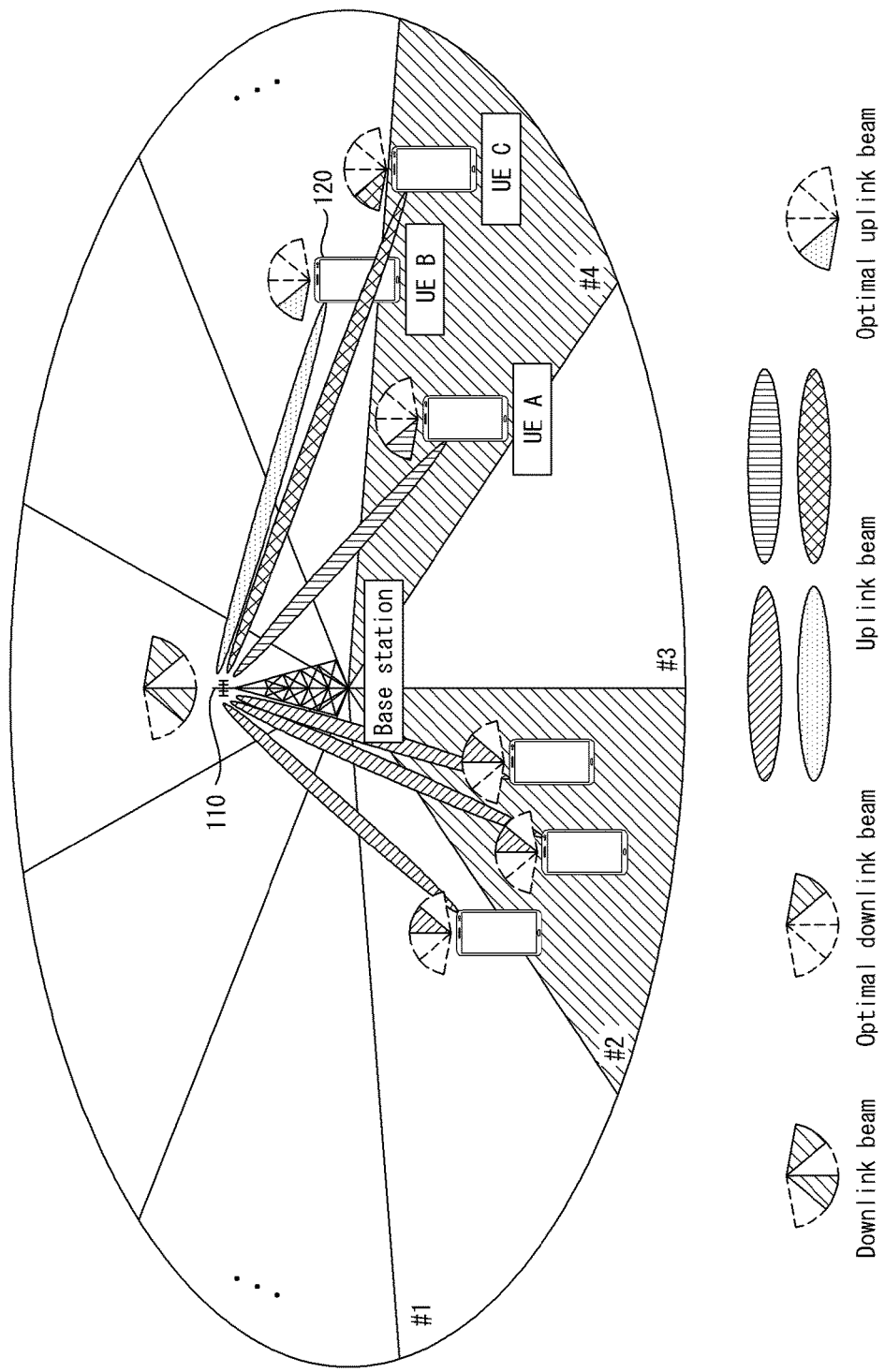
FIG. 1 is a diagram illustrating a wireless network environment to which a random access method using random beam-switching has been applied according to an embodiment of the present disclosure.

The present disclosure may be modified in various ways and may have various embodiments. Specific embodiments are to be illustrated in the drawings and specifically described in the detailed description. It is however to be understood that the present disclosure is not intended to be limited to specific embodiments, but include all of modifications, equivalents and/or substitutions included in the technical spirit and technical scope of the present disclosure. In describing the present disclosure, a detailed description of known techniques will be omitted if it is deemed to make the gist unnecessarily vague.

Terms, such as a "first" and a "second", may be used to describe various elements, but the elements should not be restricted by the terms. The terms are used to only distinguish one element from the other element.

The terms used in the present disclosure are used to merely describe specific embodiments and are not intended to restrict the present disclosure. Terms used in the present disclosure are common terms currently and widely used by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the invention. Accordingly, terms used in the present disclosure should be defined based on their substantial meanings and contents over the present disclosure, not the simple names of the terms.

An expression of the singular number includes an expression of the plural number unless clearly defined otherwise in the context. In the present disclosure, it is to be understood that a term, such as "include" or "have", is intended to designate that a characteristic, a number, a step, an operation, an element, a part or a combination of them described in the specification is present, and does not exclude the presence or addition possibility of one or more other characteristics, numbers, steps, operations, elements, parts, or combinations of them in advance.

Hereinafter, embodiments of the present disclosure are described in detail with reference to the accompanying drawings. In describing the embodiments with reference to the accompanying drawings, the same element is assigned the same reference numeral, and a redundant description of the same element is omitted.

FIG. 1 is a diagram illustrating a wireless network environment to which a random access method using random beam-switching has been applied according to an embodiment of the present disclosure.

FIG. 1 illustrates an example of a configuration of a network including UEs 120 and a base station 110 performing a random access channel (RACH) method using random beam-switching in a wireless network (e.g., a 5G network).

In an embodiment of the present disclosure, the base station 110 is disposed in the middle of the network. The UEs 120 attempting to process a random access channel (RACH) process in order to have resource assigned thereto are uniformly distributed around the base station 110. An area covered by the base station 110 is divided into multiple sub-areas #1, #2, #3, and #4. The base station 110 transmits a downlink beam to the UEs 120, and the UEs 120 transmit uplink beams to the base station 110. The base station 110 may have an optimal downlink beam in a direction that faces the UEs 120 for each sub-area. In contrast, the UEs 120 may have optimal uplink beams in directions that face the base station 110 for each sub-area in which each UE is disposed.

Figure 2:
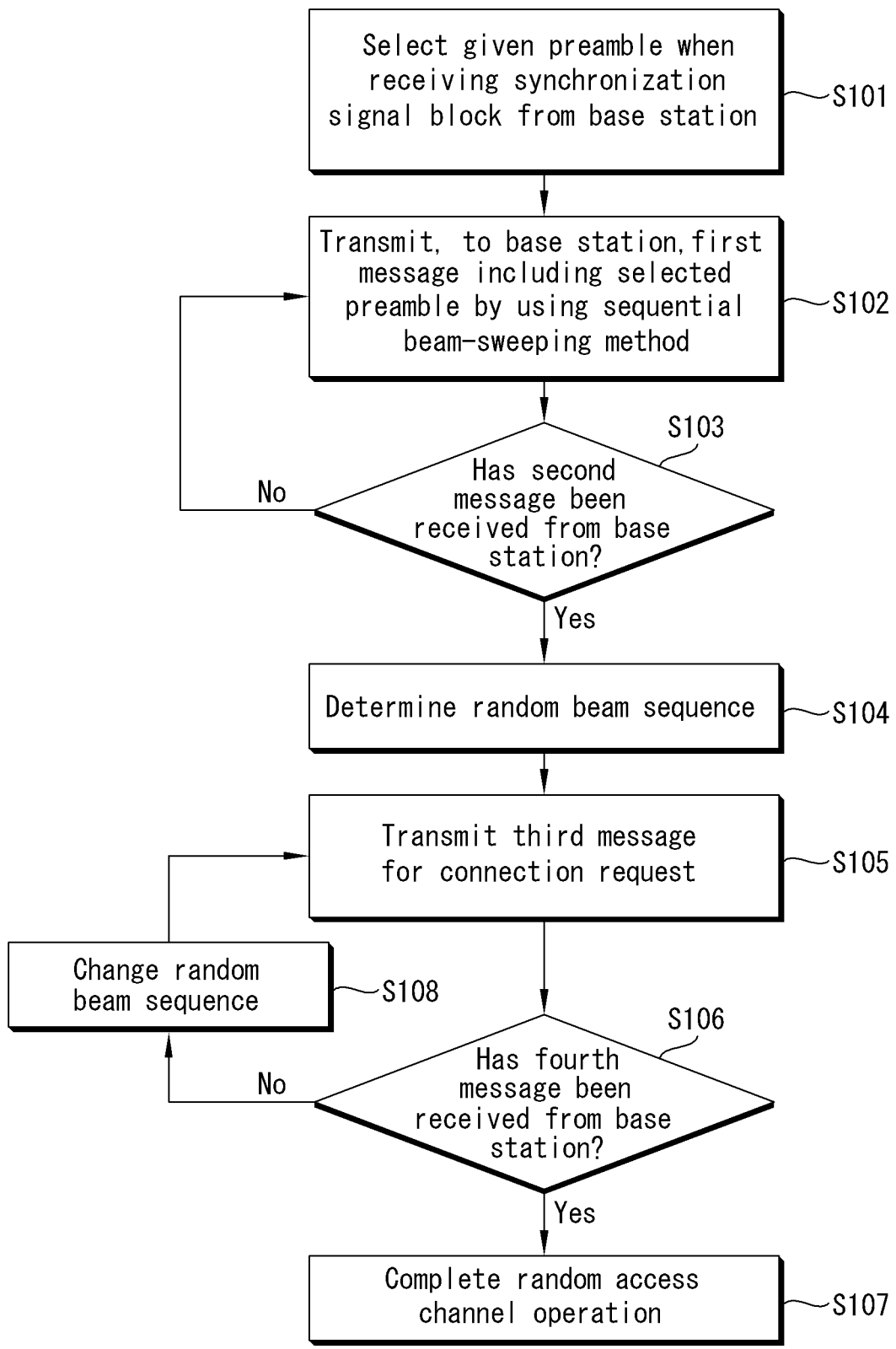
FIG. 2 is a flowchart of a random access method using random beam-switching in a wireless network environment according to an embodiment of the present disclosure.

FIG. 2 is a flowchart of a random access method using random beam-switching in a wireless network environment according to an embodiment of the present disclosure.

In step S101, the UE 120 including a random access apparatus selects a given preamble when receiving a synchronization signal block from the base station 110.

In step S102, the UE 120 transmits, to the base station 110, a first message including the selected preamble by using a sequential beam-sweeping method. The UE 120 uses the beam-sweeping technology in which beams are continuously transmitted in order to transmit a preamble message to the base station 110.

In step S103, the UE 120 checks whether a second message responding to the first message has been received from the base station 110.

In step S104, when receiving the second message responding to the first message from the base station 110, the UE 120 determines a random beam sequence to be used in random beam switching.

In step S105, the UE 120 transmits a third message Msg3 for a connection request for uplink data transmission. In order to transmit the third message, the UE 120 uses the beam-switching technology in which the third message is transmitted in the random beam sequence. In contrast, when not receiving a response message from the base station 110 within a response time, the UE 120 performs step S105 again by using a beam having a next sequence.

In step S106, the UE 120 checks whether a fourth message has been received from the base station 110 as a response to the third message.

In step S107, when receiving the fourth message responding to the transmitted third message, the UE 120 completes the random access channel operation.

In contrast, in step S108, when not receiving the fourth message responding to the transmitted third message, the UE 120 changes the random beam sequence and retransmits the third message. In an embodiment of the present disclosure, when not receiving the fourth message Msg4 from the base station within a response time although the UE 120 has transmitted the third message Msg3 at all angles through beam-switching, the UE 120 may recognize that a collision has occurred in the process of transmitting the third message Msg3. The UE 120 that has recognized the collision of the third message Msg3 may determine a new random beam sequence, may retransmit the third message Msg3, and may avoid a collision if the third message Msg3 is transmitted through an optimal uplink beam at different timing in the beam sequence of each of the UEs.

As described above, the random access method according to an embodiment of the present disclosure includes transmitting, by the UE 120, a preamble message by using the beam-sweeping method, and transmitting a third message Msg3 for a connection request in a random sequence for uplink data transmission by using the beam-switching method. Furthermore, in an embodiment of the present disclosure, if multiple UEs select the same preamble and a collision occurs because pieces of timing at which the UEs transmit the third messages Msg3 through optimal uplink beams are redundant, corresponding UEs determine new random beam sequences to be used for beam-switching and retransmit the third messages Msg3, thereby being capable of improving an RACH re-access procedure.

In a random access method according to an embodiment of the present disclosure, when the UEs 120 transmit the third messages Msg3, if the beam-switching method using a random sequence is used, the UEs 120 may divide times when the third messages Msg3 are transmitted through optimal uplink beams, and may transmit the third messages Msg3. Accordingly, a collision problem occurring when the third messages Msg3 are transmitted can be reduced, and an average access delay time of the UE 120 can be reduced. Furthermore, the number of messages transmitted by the UE 120 can be reduced compared to a conventional RACH procedure because a re-access procedure according to a collision between the third messages Msg3 is efficiently constructed. Accordingly, average energy consumption of the UE 120 can be reduced.

Figure 3:
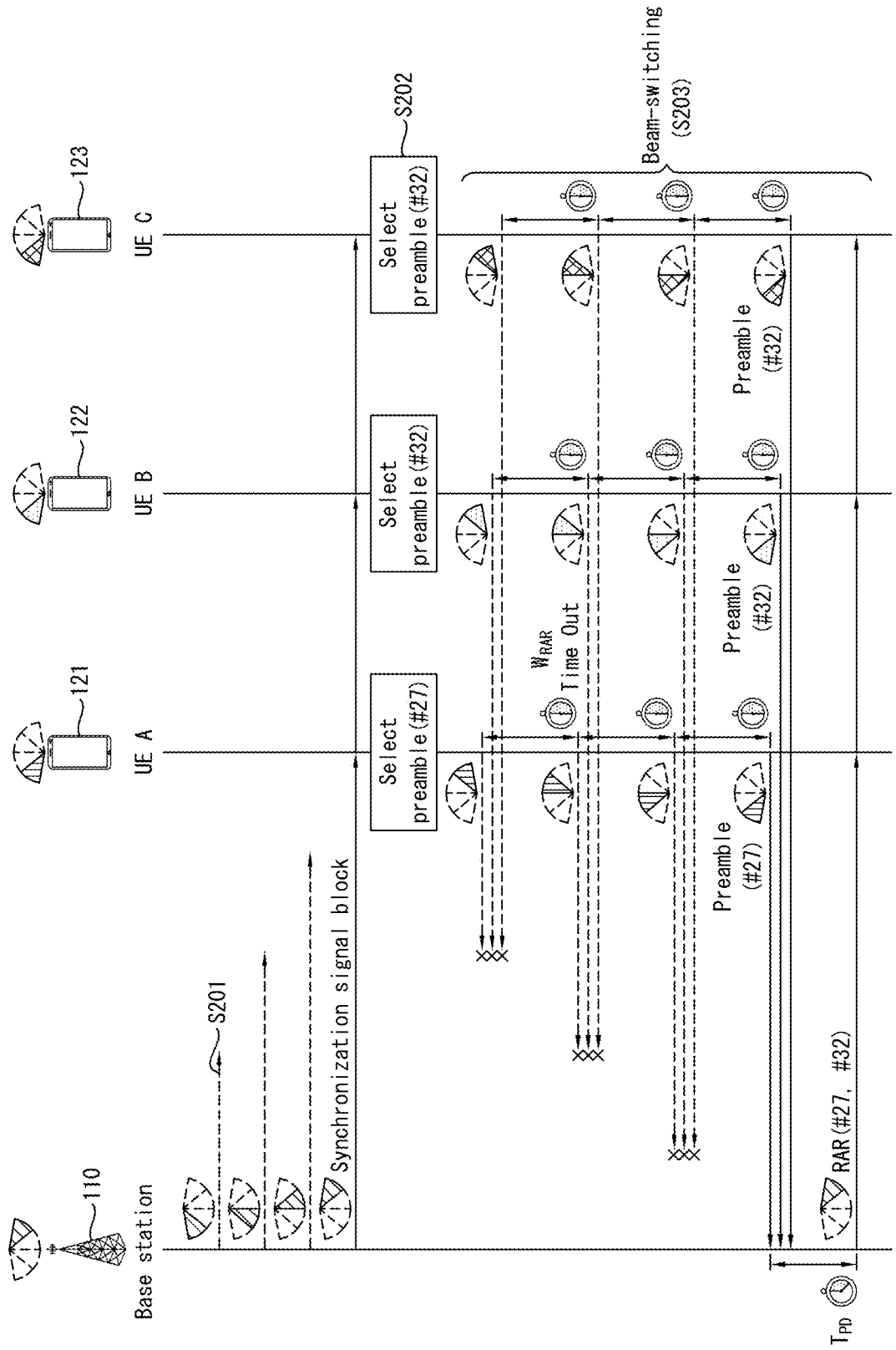
FIGS. 3 and 4 illustrate a conventional random access method.
Figure 4:
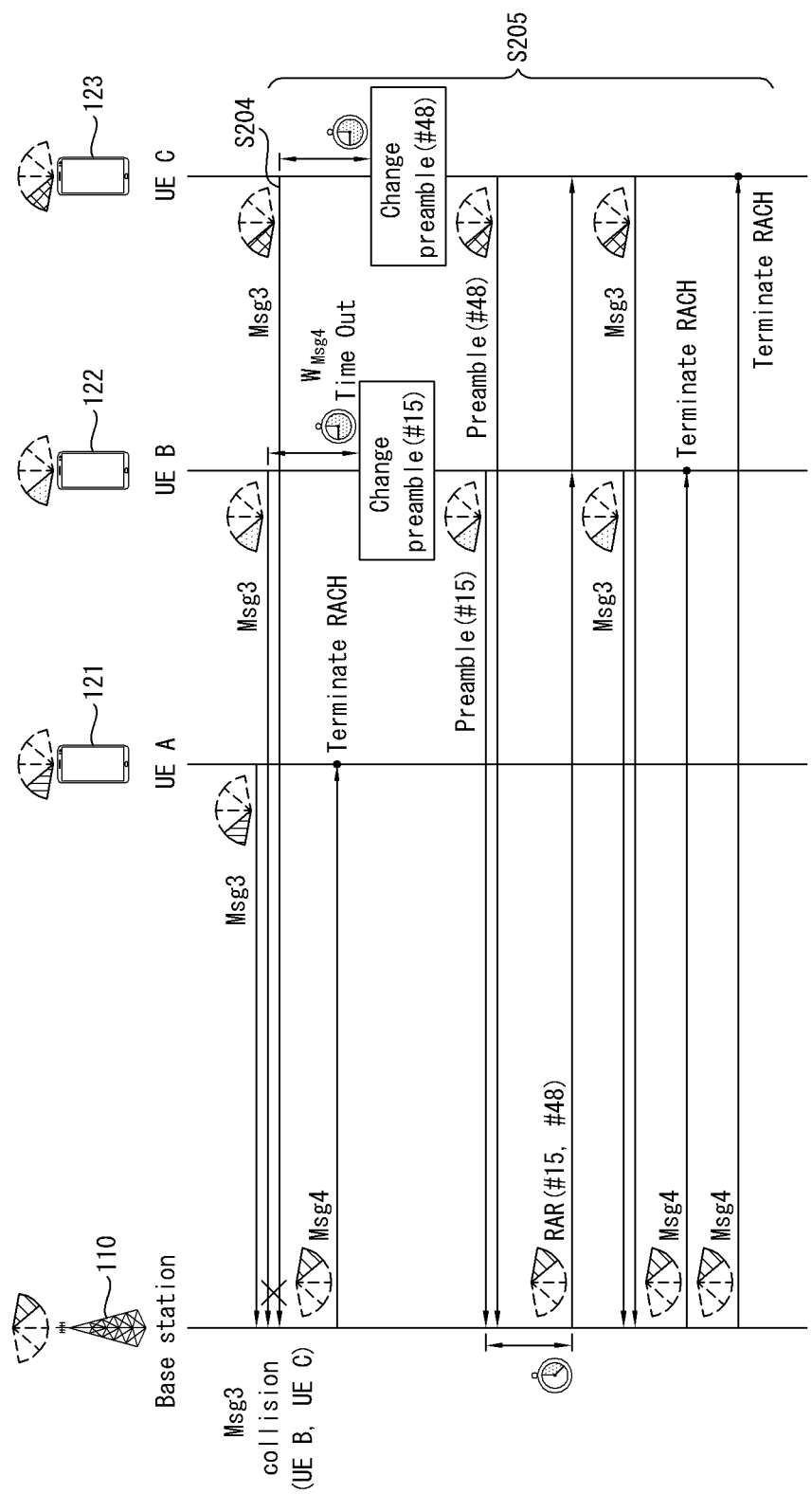
Figure 5:
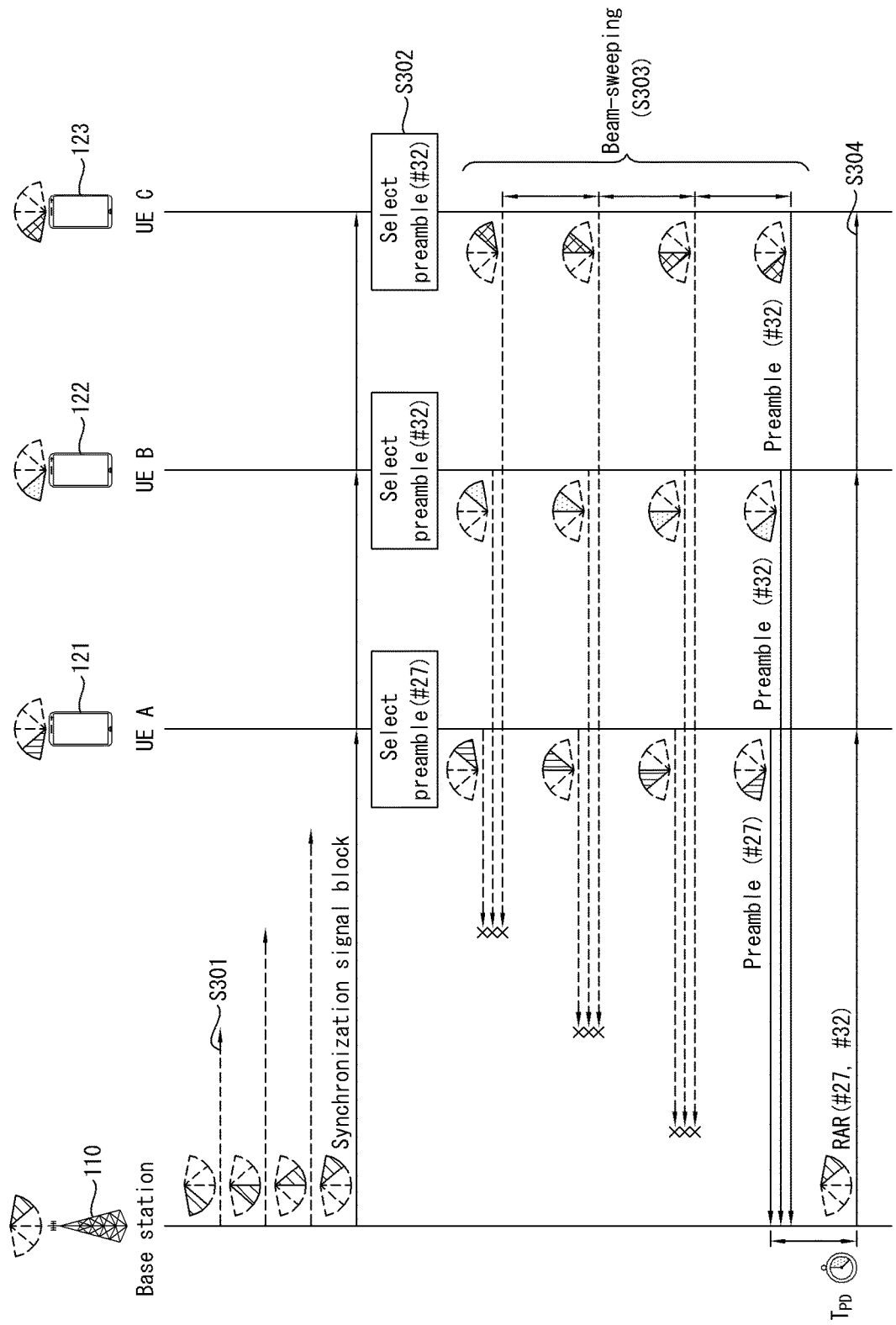
FIGS. 5 and 6 are diagrams illustrating a random access method using random beam-switching in a wireless network environment according to an embodiment of the present disclosure.
Figure 6:
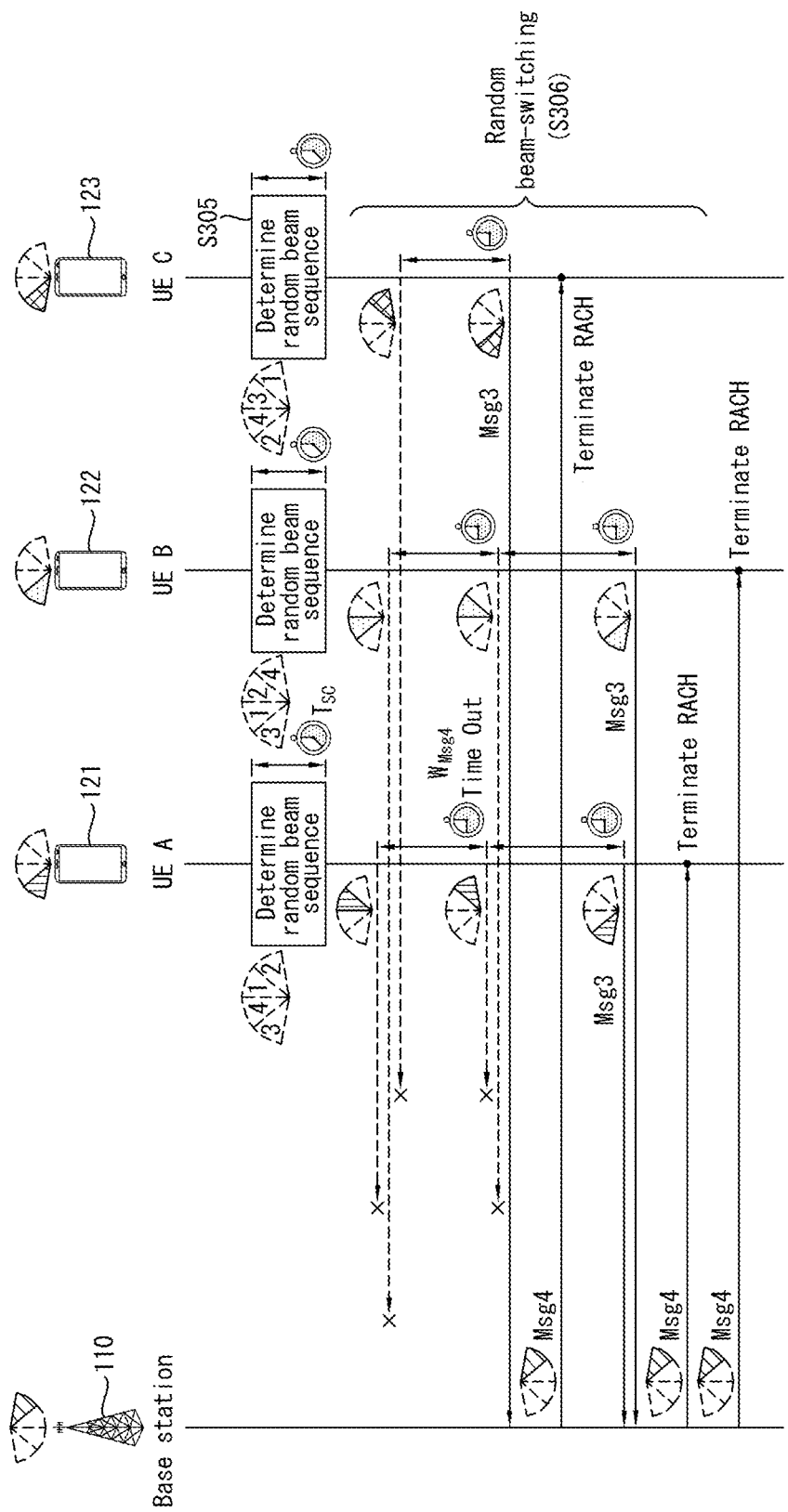

FIGS. 3 and 4 illustrate a conventional random access method. FIGS. 5 and 6 are diagrams illustrating a random access method using random beam-switching in a wireless network environment according to an embodiment of the present disclosure.

FIGS. 3 and 4 are examples of an operation of a conventional RACH procedure in a 5G network. FIGS. 5 and 6 illustrate an example of an operation of a random access method using random beam-switching according to an embodiment of the present disclosure. In this case, FIGS. 5 and 6 illustrate a random access method between one base station 110 and multiple UEs, that is, a UE A 121, a UE B 122, and a UE C 121.

As illustrated in FIGS. 3 and 4, in step S201, the conventional RACH procedure is started after the UEs receive a synchronization signal block from the base station 110.

In steps S202 and S203, the UEs that have received the synchronization signal block of the base station 110 select given preambles and transmit the selected preambles through beam-switching.

In step S204, when receiving a random access response (RAR) message from the base station 110 within a response time after transmitting the preamble message, the UEs determine, as optimal uplink beams, beams used to transmit the corresponding preamble messages and transmit third messages Msg3 by using the corresponding beams.

In step S205, the base station 110 that has received the third message Msg3 of the UE normally transmits a fourth message Msg4 (contention resolution) as a response to a contention solution. When the UE receives the fourth message Msg4 corresponding to the third message Msg3 transmitted by the UE, the RACH process is terminated.

Hereinafter, an embodiment of the present disclosure is described with reference to FIGS. 5 and 6.

As illustrated in FIGS. 5 and 6, as in the conventional RACH procedure, in step S301, in the random access method according to an embodiment of the present disclosure, an RACH process is started after the UE receives a synchronization signal block from the base station 110.

In steps S302 and S303, the UEs that have received the synchronization signal block of the base station 110 select given preambles and transmit the selected preambles to the base station 110 through beam-sweeping. In this case, the UE A 121 selects a preamble #27, and the UE B 122 and the UE C 123 select a preamble #32.

In step S304, the base station 110 that has received the preambles transmitted by the UEs normally transmits RAR messages #27 and #32.

In step S305, the UEs that have received the RAR messages determine random beam sequences. For example, the UE A 121 determine random beams in order of 2, 1, 4, and 3 from a right direction, the UE B 122 determines random beams in order of 4, 2, 1, and 3 from the right direction, and the UE C 123 determines random beams in order of 1, 3, 4, and 2 from the right direction.

In step S306, the UEs that have determined the random beam sequences transmit third messages Msg3 to the base station 110 by using a random beam switching method. When receiving a fourth message Msg4 from the base station 110 within a response time after transmitting the third message Msg3, the UE determines, as an optimal uplink beam, a beam used to transmit the corresponding third message Msg3. Accordingly, the RACH process is terminated.

The preambles selected by the UEs in the start step of the RACH procedure have an orthogonal property. Accordingly, a collision does not occur although the UEs transmit the selected preambles at the same timing. In this case, the UE C 123 receives the fourth message Msg4 from the base station 110 as a response to the transmission of the third message Msg3 at second timing, so that the RACH procedure is terminated. Furthermore, the UE A 121 receives the fourth message Msg4 from the base station 110 as a response to the transmission of the third message Msg3 at third timing, so that the RACH procedure is terminated. The UE B 122 receives the fourth message Msg4 from the base station 110 as a response to the transmission of the third message Msg3 at third timing, so that the RACH procedure is terminated. At this time, although the UE A 121 and the UE B 122 have transmitted the third messages Msg3 at the same timing, a collision does not occur between the third messages Msg3 because the previously selected preambles are different as the preamble #27 and the preamble #32. The UE A 121 and the UE B 122 receive the fourth messages Msg4 from the base station 110, respectively, so that the RACH procedure is terminated.

If multiple UEs have selected the same preamble, the base station 110 recognizes the plurality of received preambles as one and transmits, as a response, one RAR message including resource information for transmitting the third message Msg3. Accordingly, a collision occurs because UEs that have selected the same preamble transmit the third messages Msg3 by using the same resource.

In such a case, in the conventional RACH procedure, a collision between the third messages Msg3 cannot be avoided because an optimal uplink beam is determined in a process of transmitting the preamble and multiple UEs transmit the third messages Msg3 by using the same resource.

In contrast, in an embodiment of the present disclosure, a preamble message is transmitted through beam-sweeping, a resource for transmitting the third message Msg3 is allocated, and an optimal uplink beam is determined by using beam-switching using a random sequence in the step of transmitting the third message Msg3. Accordingly, in an embodiment of the present disclosure, a collision between the third messages Msg3 can be avoided because times when UEs transmit the third messages Msg3 through optimal uplink beams are separated by using beam-switching using a random sequence.

Furthermore, in the conventional RACH procedure, when a collision occurs between the third messages Msg3, a re-access procedure is started from preamble retransmission in order to receive a new resource allocated thereto. In the random access method according to an embodiment of the present disclosure, however, a re-access procedure can be simplified because a collision can be avoided by changing a beam sequence in which the third messages Msg3 are transmitted.

Figure 7:
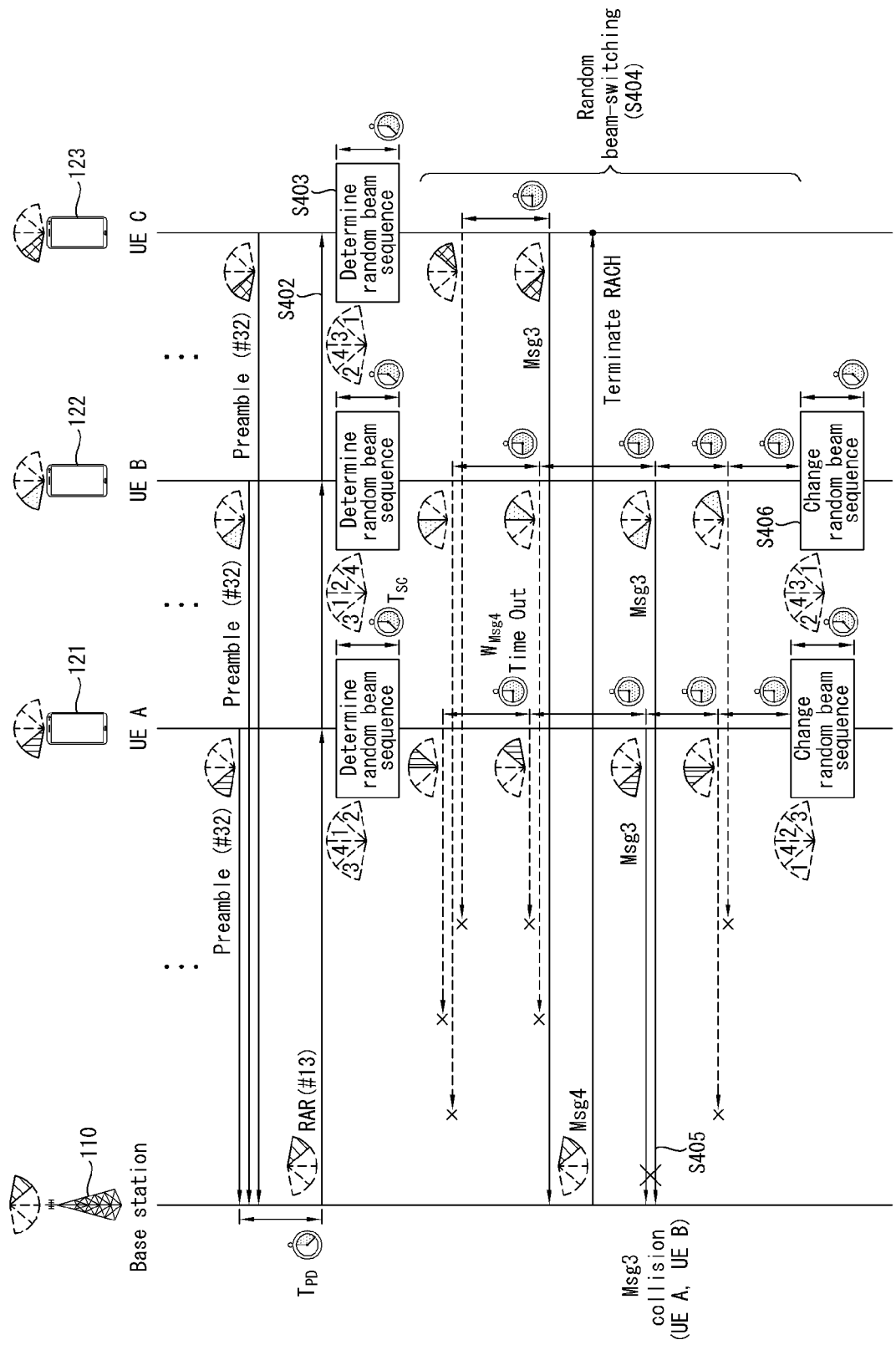
FIGS. 7 and 8 are diagrams illustrating an example of an RACH operation in a situation in which UEs select the same preamble within the same sector in an embodiment of the present disclosure.
Figure 8:
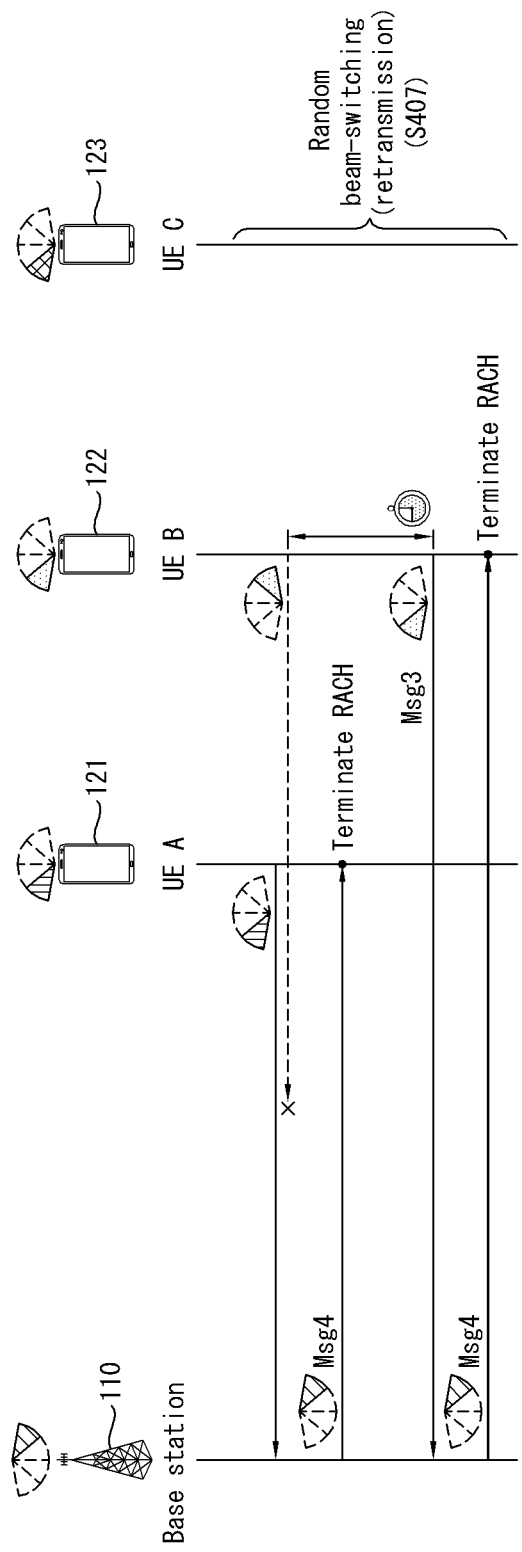

FIGS. 7 and 8 are diagrams illustrating an example of an RACH operation in a situation in which UEs select the same preamble within the same sector in an embodiment of the present disclosure.

In the example illustrated in FIGS. 7 and 8, in step S401, all the UEs select the same preamble #32 after receiving a synchronization signal block from the base station 110, and transmit the selected preambles by using the beam-sweeping method.

Thereafter, in step S402 and S403, UEs that have receive RAR messages for the transmitted preambles #32 from the base station 110 determine random beam sequences.

In step S404, the UEs transmit third messages Msg3 through beam-switching. The base station 110 that has received the third message Msg3 of the UE C 123 normally transmits a fourth message Msg4. The UE C 123 receives a fourth message Msg4 responding to the third message Msg3 transmitted by the UE C 123, so that the RACH process is terminated normally.

In contrast, in step S405, in a process of transmitting, by the UE A 121 and the UE B 122, the third messages Msg3 through beam-switching, a collision occurs between the third messages Msg3 because the UE A 121 and the UE B 122 transmit the third messages Msg3 at the same timing through optimal uplink beams.

In step S406, the UE A 121 and the UE B 122 that have not received the fourth message Msg4 within a response time due to a collision between the third messages Msg3 although they have transmitted the third message Msg3 at all angles through beam-switching newly determine beam sequences to be used for beam-switching.

Thereafter, in step S407, the UE A 121 and the UE B 122 retransmit the third messages Msg3 through random beam switching of new beam sequences and receive the fourth messages Msg4, so that the RACH process is terminated normally.

Figure 9:
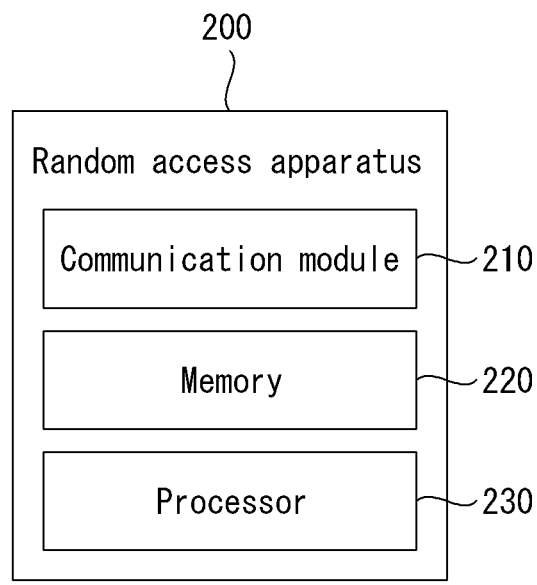
FIG. 9 is a configuration diagram of a random access apparatus using random beam-switching according to an embodiment of the present disclosure.

FIG. 9 is a configuration diagram of a random access apparatus using random beam-switching according to an embodiment of the present disclosure.

As illustrated in FIG. 9, the random access apparatus 200 using random beam-switching according to an embodiment of the present disclosure includes a communication module 210, a memory 220, and a processor 230. However, all the illustrated elements are not essential elements. The random access apparatus 200 may be implemented by more elements than the illustrated elements, and may be implemented by smaller elements than the illustrated elements. The random access apparatus 200 is implemented by being included in the UE 120 that performs a random access operation along with the base station 110, and performs a random access channel operation along with the base station 110 by using random beam switching and beam sweeping.

Hereinafter, a detailed configuration and operation of each of the elements of the random access apparatus 200 in FIG. 9 are described.

The communication module 210 communicates with the base station 110 for a random access channel in a wireless network environment.

The memory 220 stores one or more programs.

The processor 230 executes one or more programs stored in the memory 220. When receiving a synchronization signal block from the base station 110 through the communication module, the processor 230 selects a given preamble, transmits, to the base station 110, a first message including the selected preamble through the communication module by using the sequential beam-sweeping method, transmits a third message for a connection request through the communication module 210 for uplink data transmission when receiving a second message responding to the first message from the base station 110, and completes the random access channel operation when receiving a fourth message responding to the transmitted third message.

According to embodiments, when a collision occurs between transmitted third messages, the processor 230 may change a new random beam sequence to be used for beam-switching and retransmit the third message through the communication module 210.

According to embodiments, if the plurality of UEs 120 selects the same preamble and transmits the preambles to the base station 110, respectively, a collision may occur between transmitted third messages because the base station 110 recognizes the plurality of same preambles as one and the plurality of UEs 120 receives responses, respectively, through one response message.

According to embodiments, a collision does not occur between the selected preamble and another preamble transmitted by another UE at the same timing because the selected preamble has an orthogonal property.

According to embodiments, when receiving a second message responding to a first message from the base station 110, the processor 230 may determine a random beam sequence, and may transmit a third message for a connection request for uplink data transmission by using a beam-switching method using a random beam sequence determined by the base station 110 through the communication module.

According to embodiments, the processor 230 can avoid a collision between third messages by separating times when UEs transmit, through the communication module, the third messages through uplink beams by using beam-switching using a random sequence.

According to embodiments, the processor 230 may adjust the number of beams to be used in the beam-switching method based on the number of UEs deployed in a wireless network environment.

According to embodiments, when receiving the second message (i.e., a random access response (RAR)) responding to the first message from the base station 110, the processor 230 may transmit the third message for a connection request for uplink data transmission through the communication module 210.

According to embodiments, the processor 230 may receive, from the base station 110, an allocated resource for transmitting the third message through the received second message.

According to embodiments, when receiving the fourth message responding to the transmitted third message, the processor 230 may determine, as an uplink beam, a beam used to transmit the third message.

Figure 10:
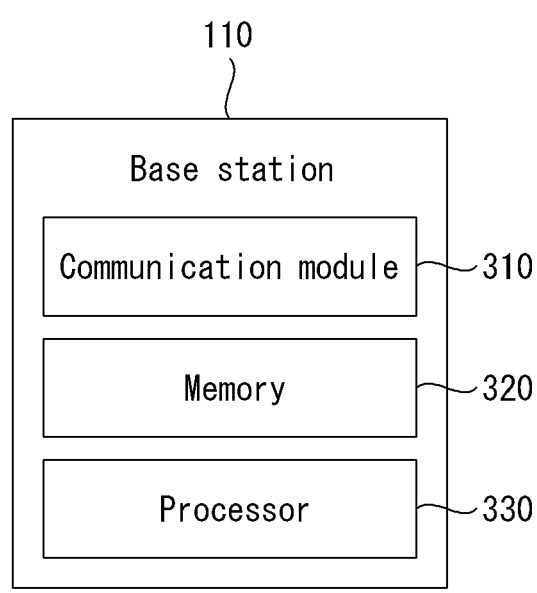
FIG. 10 is a configuration diagram of a base station for random access using random beam-switching according to an embodiment of the present disclosure.

FIG. 10 is a configuration diagram of a base station for random access using random beam-switching according to an embodiment of the present disclosure.

As illustrated in FIG. 10, the base station 110 for random access using random beam-switching according to an embodiment of the present disclosure includes a communication module 310, a memory 320, and a processor 330. However, all the illustrated elements are not essential elements. The base station 110 may be implemented by more elements than the illustrated elements, and may be implemented by smaller elements than the illustrated elements.

Hereinafter, a detailed configuration and operation of each of the elements of the base station 110 in FIG. 10 are described.

The communication module 310 communicates with the UE 120 for a random access channel in a wireless network environment.

The memory 320 stores one or more programs.

The processor 330 executes one or more programs stored in the memory 320. The processor 330 transmits a synchronization signal block for random access initiation to the UE 120 through the communication module 310, receives, from the UE, a first message including a randomly selected preamble by using the sequential beam-sweeping method, transmits a second message, that is, a response message for the received first message, to the UE, receives, from the UE, a third message for a connection request for uplink data transmission, and transmits a fourth message responding to the received third message to the UE.

According to embodiments, a collision does not occur between the selected preamble and another preamble transmitted by another UE at the same timing because the selected preamble has an orthogonal property.

According to embodiments, the processor 330 may receive the third message for a connection request from the uplink data transmission by using a beam-switching method using a random beam sequence determined in the UE through the communication module.

In the beam-switching method using the random beam sequence, a collision between the third messages can be avoided by separating times when UEs transmit the third messages through uplink beams.

According to embodiments, the processor 330 may allocate a resource for transmitting the third message by transmitting the second message to the UE through the communication module.

FIG. 11 is a diagram illustrating parameters used in simulations for a random access method according to an embodiment of the present disclosure.

In order to check performance of the random access method according to an embodiment of the present disclosure, the UE 120 was deployed in a network, and collision probability of the third messages Msg3 according to the number of UEs and an average network access delay time was measured through simulations. FIG. 11 illustrates parameters used in the simulations. The base station 110 is disposed at the origin point, and the UEs 120 are uniformly deployed on the basis of the base station 110.

Figure 12:
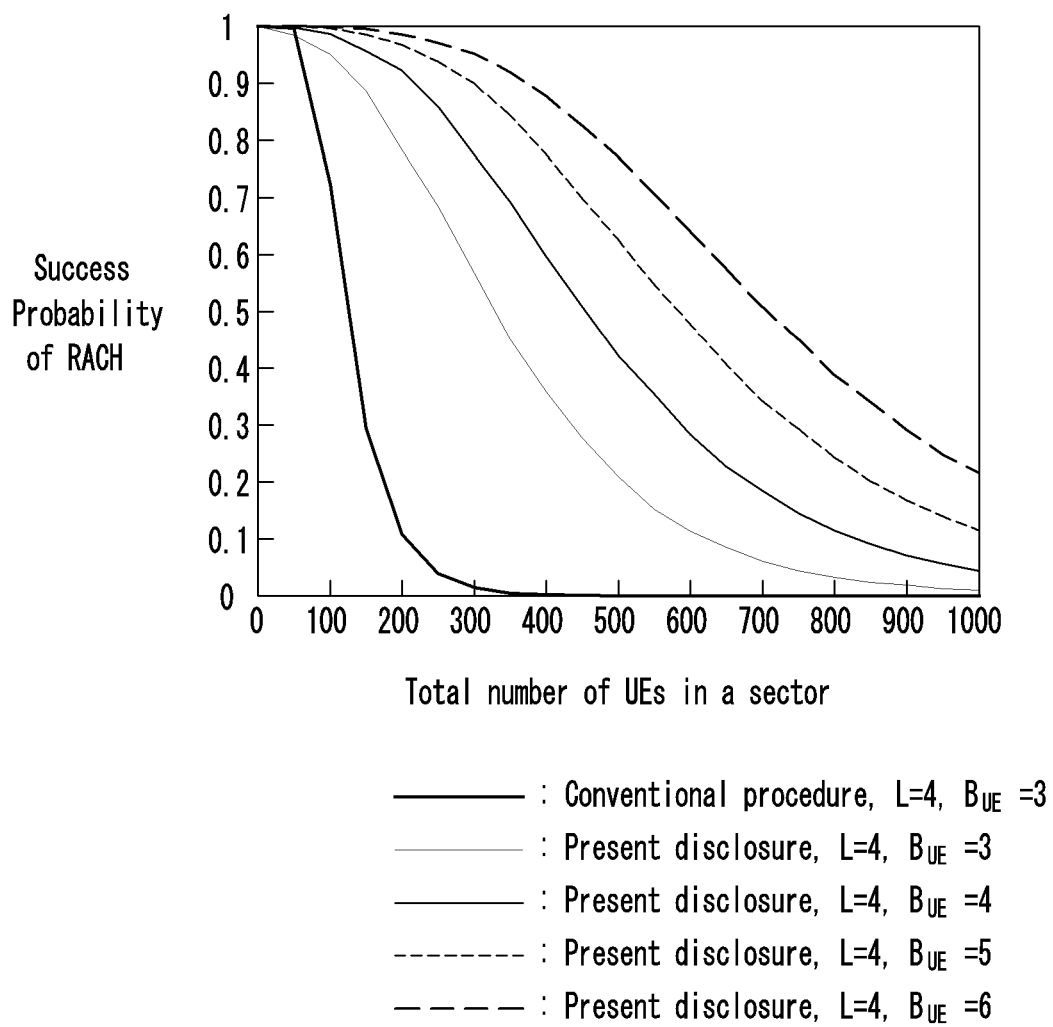
FIG. 12 is a diagram illustrating probabilities of a conventional RACH procedure and RACH procedures that will be successfully terminated by a UE in an embodiment of the present disclosure.

FIG. 12 is a diagram illustrating probabilities of a conventional RACH procedure and RACH procedures that will be successfully terminated by a UE in an embodiment of the present disclosure.

FIG. 12 is a graph illustrating probabilities of a conventional RACH procedure and RACH procedures that will be successfully terminated by a UE when a maximum retransmission number (L) of preamble messages and third messages Msg3 are determined in an embodiment of the present disclosure. In the case of the conventional RACH procedure, a collision occurs because multiple UEs transmit the third messages Msg3 at the same timing when selecting the same preamble.

In contrast, in an embodiment of the present disclosure, a collision can be avoided if timing at which the third message Msg3 is transmitted through an optimal uplink beam is different although multiple UEs select the same preamble and transmit the third messages Msg3 because the third messages Msg3 are transmitted by using beam-switching using a random sequence. Accordingly, in the random access method according to an embodiment of the present disclosure, a probability that an RACH procedure will be successful within a limited retransmission number L is higher than that in the conventional RACH procedure. That is, as illustrated in FIG. 8, it can be seen that success probabilities of the RACH procedures according to an embodiment of the present disclosure are higher than that in the conventional RACH procedure.

Furthermore, in the random access method according to an embodiment of the present disclosure, if the number of beams ($B_{UE}$) used by a UE is increased from 3 to 6, a collision probability of the third messages Msg3 is reduced because a probability that a sequence in which the third message Msg3 is transmitted through an optimal uplink beam will be redundant with a sequence in which another UE is transmitted is reduced. Accordingly, in an embodiment of the present disclosure, a probability that a UE will successfully terminate an RACH is higher than that in the conventional RACH procedure.

Figure 13:
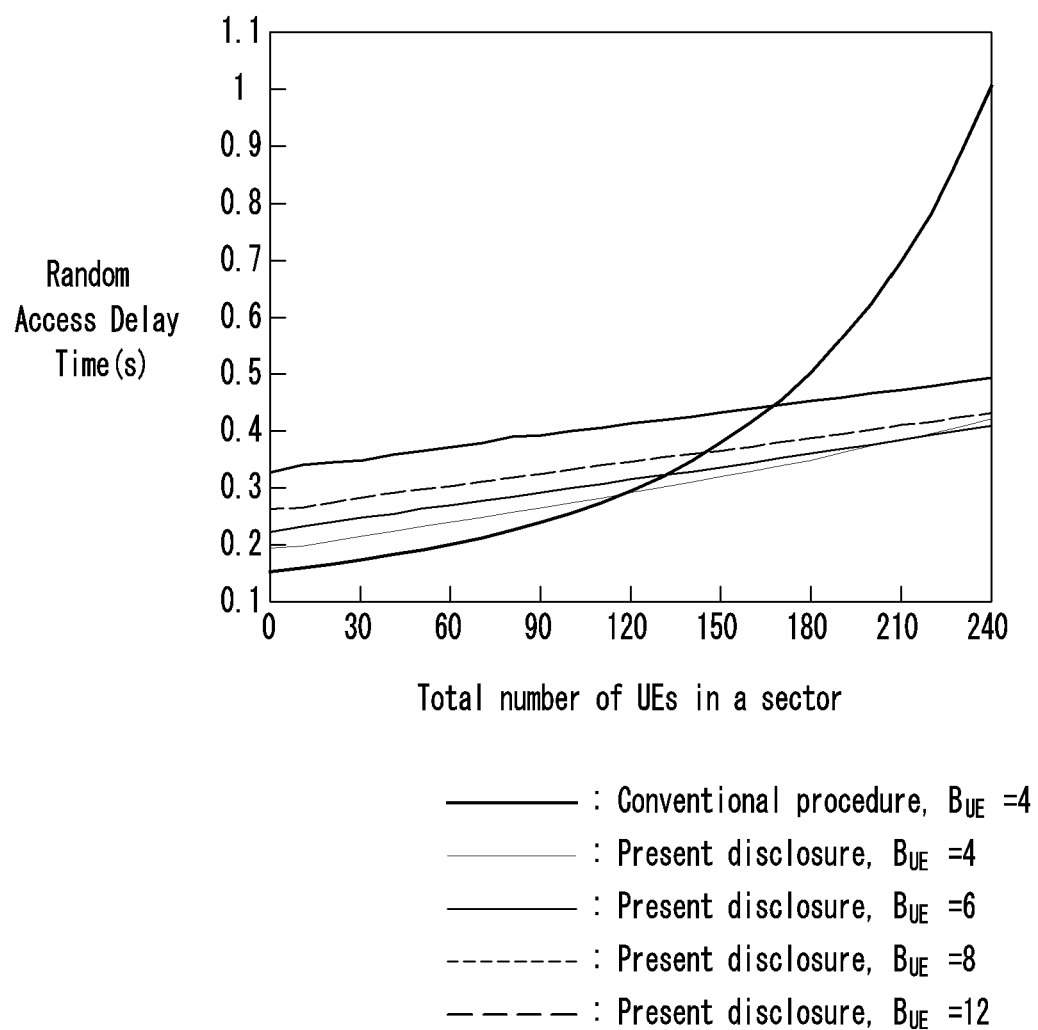
FIG. 13 is a diagram illustrating average access delay times of a conventional RACH procedure and a random access method according to an embodiment of the present disclosure.

FIG. 13 is a diagram illustrating average access delay times of a conventional RACH procedure and a random access method according to an embodiment of the present disclosure.

It may be seen that average access delay times are increased as the number of UEs contending each other is increased from 0 to 240 in both the conventional RACH procedure and the random access method according to an embodiment of the present disclosure. The random access method according to an embodiment of the present disclosure has lower performance than the conventional RACH procedure in a situation in which the number of UEs is small. However, it may be seen that the random access method according to an embodiment of the present disclosure has better performance than the conventional RACH procedure because an average access delay time of the conventional RACH procedure is greatly increased as the number of UEs is increased.

A factor that greatly influences an average access delay time of a network is a beam-switching time, and it corresponds to a preamble transmission process in the conventional RACH procedure and corresponds to a third message (Msg3) transmission process in an embodiment of the present disclosure.

When the number of contending UEs is small, a probability that UEs will select the same preamble and a collision probability of the third messages Msg3 are reduced. Accordingly, performance efficiency of the random access method of beam-switching the third message Msg3 having a relatively long length according to an embodiment of the present disclosure is lower than that of the conventional RACH procedure.

In contrast, when the number of contending UEs is increased, a probability that UEs will redundantly select a preamble is increased. In the case of the random access method according to an embodiment of the present disclosure, when preamble redundancy occurs, contention can be reduced by separating times when the third messages Msg3 are transmitted. Although a collision occurs between the third messages Msg3, the third message Msg3 may be retransmitted through an efficient re-access procedure compared to the conventional RACH procedure. Accordingly, it can be seen that as the number of UEs is increased, the random access method according to an embodiment of the present disclosure has higher average access delay time performance than the conventional RACH procedure.

Figure 14:
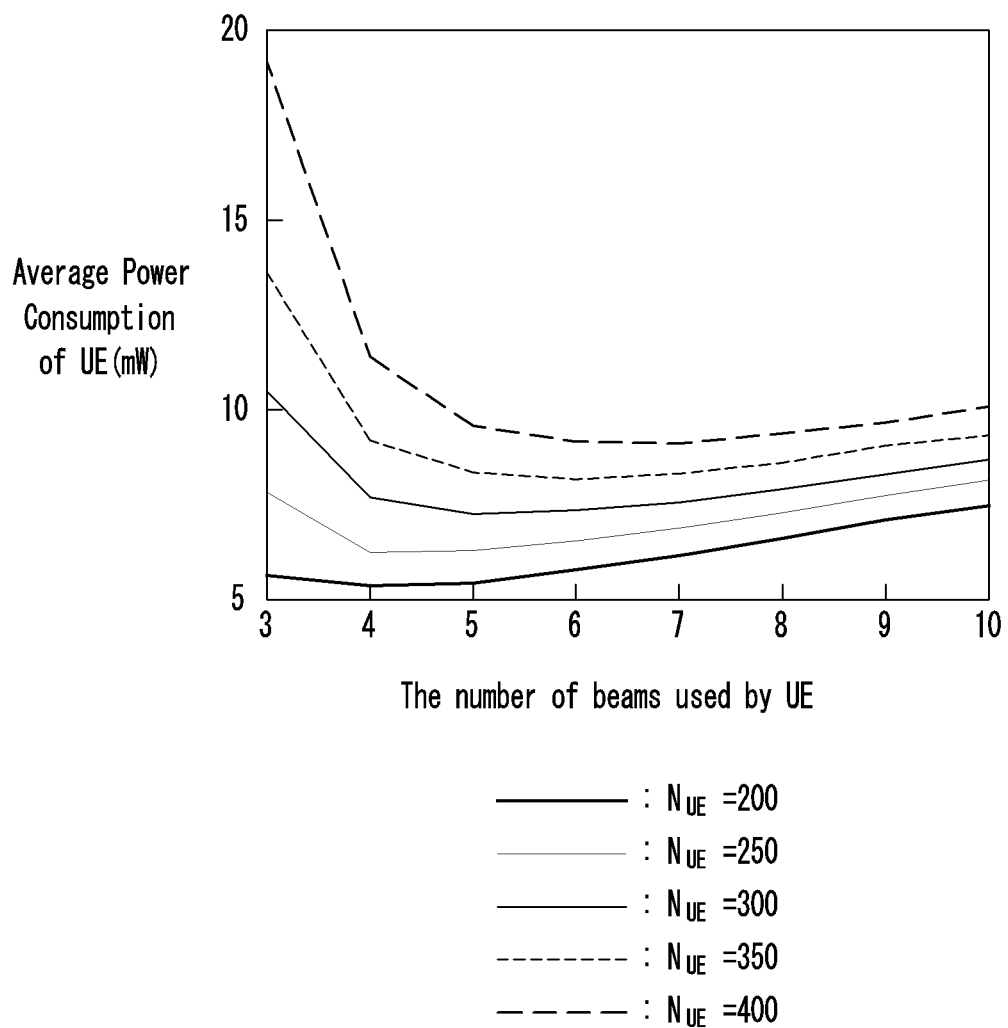
FIG. 14 is a diagram illustrating average power consumption according to the number of beams used by a UE in a random access method according to an embodiment of the present disclosure.

FIG. 14 is a diagram illustrating average power consumption according to the number of beams used by a UE in a random access method according to an embodiment of the present disclosure.

In the random access method according to an embodiment of the present disclosure, when the number of beams used by a UE is small, the number of messages transmitted by the UE is increased because a collision is increased in a third message (Msg3) transmission process and frequency of the RACH re-access procedure is increased. In contrast, when the number of beams used by the UE is many, the number of messages transmitted by the UE is increased because a beam-switching number in the third message (Msg3) transmission process is too many. Accordingly, in the random access method according to an embodiment of the present disclosure, a UE may determine an optimal number of beams to be used based on the number of UEs, and may calculate an optimal number of beams according to the number of UEs for improving energy efficiency based on the results of corresponding simulations.

An embodiment of the present disclosure may construct an efficient RACH procedure by using the improved beam-sweeping and beam-switching technologies, and may be used in a large-scale cellular network in which multiple UEs are present because it shows efficient performance when many UEs are present in a network.

There may be provided a non-transitory computer-readable storage medium for storing instructions enabling the processor to execute a method when being executed by the processor, including selecting a given preamble when receiving a synchronization signal block from a base station, transmitting, to the base station, a first message including the selected preamble by using a sequential beam-sweeping method, transmitting a third message for a connection request for uplink data transmission when receiving, from the base station, a second message responding to the transmitted first message, and completing a random access channel operation when receiving a fourth message responding to the transmitted third message.

There may be provided a non-transitory computer-readable storage medium for storing instructions enabling the processor to execute a method when being executed by the processor, including transmitting a synchronization signal block for random access initiation to a user equipment (UE), receiving, from the UE, a first message including a randomly selected preamble by using a sequential beam-sweeping method, transmitting, to the UE, a second message responding to the received first message, receiving, from the UE, a third message for a connection request for uplink data transmission, and transmitting, to the UE, a fourth message responding to the received third message.

According to various embodiments of the present disclosure, the aforementioned various embodiments may be implemented as software including instructions stored in machine (e.g., computer)-readable storage media. A device is an apparatus which can invoke a stored instruction from the storage media and operate in response to the invoked instruction, and may include an electronic device (e.g., an electronic device (AI)) according to the disclosed embodiments. When an instruction is executed by a processor, the processor may perform a function, corresponding to the instruction, directly or by using other elements under the control of the processor. The instruction may include a code generated or executed by a compiler or an interpreter. The machine-readable storage media may be provided in the form of a non-transitory storage media. In this case, "non-transitory" merely means that the storage media do not include a signal and are tangible, and does not distinguish between cases where data is semi-permanently or temporally stored in the storage media.

Furthermore, according to an embodiment of the present disclosure, the method according to the aforementioned various embodiments may be provided by being included in a computer program product. The computer program product may be traded between a seller and a buyer as a product. The computer program product may be distributed in the form of a machine-readable storage medium (e.g., a compact disc read only memory (CD-ROM)) or through an app store (e.g., PlayStore™) online. In the case of the online distribution, at least some of the computer program product may be at least temporarily stored or provisionally generated in storage media, such as a memory in a server of a manufacturer, a server of an app store or a relay server.

Furthermore, according to an embodiment of the present disclosure, the aforementioned various embodiments may be implemented in a recording medium readable by a computer or a similar device by using software, hardware or a combination of them. In some cases, embodiments described in the present disclosure may be implemented by a processor itself. According to a software implementation, embodiments, such as procedures or functions described in the present disclosure, may be implemented as separate software modules. Each of the software modules may perform one or more functions and operations described in the present disclosure.

Computer instructions for performing a processing operation of a device according to the aforementioned various embodiments may be stored in a non-transitory computer-readable medium. The computer instructions stored in such a non-transitory computer-readable medium may enable a specific device to execute a processing operation in a device according to the aforementioned various embodiments when executed by the processor of the specific device. The non-transitory computer-readable medium means a medium which semi-permanently stores data unlike a medium for storing data for a short time, such as a register, a cache, or a memory, and which is readable by a machine. Detailed examples of the non-transitory computer-readable medium may include a CD, a DVD, a hard disk, a Blueray disk, a USB, a memory card, or a ROM.

Furthermore, each of elements (e.g., modules or programs) according to the aforementioned various embodiments may include a single entity or a plurality of entities. Some of the aforementioned corresponding sub-elements may be omitted or other sub-elements may be further included in various embodiments. Alternatively or additionally, some elements (e.g., modules or programs) may be integrated into a single entity. The single entity may perform a function performed by each of corresponding elements before they are integrated identically or similarly. Operations performed by a module, a program or other elements according to various embodiments may be executed sequentially, in parallel, iteratively or heuristically, or at least some operations may be executed in different orders or may be omitted, or other operations may be added.

Although the preferred embodiments of the present disclosure have been illustrated and described above, the present disclosure is not limited to the aforementioned specific embodiments, and may be modified in various ways by a person having ordinary knowledge in the art to which the present disclosure pertains without departing from the subject matter of the present disclosure in the claims. Such modified embodiments should not be individually understood from the technical spirit or prospect of this specification.

DESCRIPTION OF REFERENCE NUMERALS

110: base station
120: UE
121, 122, and 123: UE A, UE B, and UE C
210, 310: communication module
220, 320: memory
230, 330: processor

What is claimed is:

1. A random access method performed by an apparatus in a wireless network environment, comprising: selecting a given preamble in response to receiving a synchronization signal block from a base station; transmitting, to the base station, a first message including the selected given preamble by using sequential beam-sweeping; transmitting a third message for a connection request for uplink data transmission in response to receiving, from the base station, a second message responding to the transmitted first message, wherein the third message is transmitted using beam-switching; and completing a random access channel operation in response to receiving a fourth message responding to the transmitted third message, wherein transmitting the third message includes: determining a random beam sequence in response to receiving the second message from the base station, and transmitting, to the base station, the third message for a connection request for the uplink data transmission by using beam-switching using the determined random beam sequence.

2. The random access method of claim 1, further comprising changing to a new random beam sequence to be used for beam-switching and retransmitting the third message when a collision occurs in the transmitted third message.

3. The random access method of claim 2,
wherein the collision of the transmitted third message occurs because, in response to a plurality of user equipments (UEs) selecting an identical preamble and transmits the respective preambles to the base station, the base station recognizes the plurality of transmitted identical preambles as one preamble and the plurality of UEs receives one response message.

4. The random access method of claim 1, wherein the selected given preamble has an orthogonal property and does not have a collision with another preamble transmitted at an identical timing by another UE.

5. The random access method of claim 1, wherein the beam-switching using the random beam sequence includes avoiding a collision of the third message by separating times in response to UEs transmitting the third messages through uplink beams.

6. The random access method of claim 1,
wherein transmitting the third message includes adjusting a number of beams to be used in the beam-switching based on a number of UEs deployed in a wireless network environment.

7. The random access method of claim 1,
wherein transmitting the third message includes transmitting the third message for a connection request for the uplink data transmission in response to receiving, from the base station, the second message responding to the transmitted first message.

8. The random access method of claim 1,
wherein transmitting the third message includes receiving a resource allocated to transmit the third message through the second message received from the base station.

9. The random access method of claim 1,
wherein completing the random access channel operation includes determining, as an uplink beam, a beam used when transmitting the third message, in response to receiving the fourth message responding to the transmitted third message.

10. A random access apparatus in a wireless network environment using random beam-switching, comprising: a communication module communicating with a base station for a random access channel in a wireless network environment; a memory storing one or more programs; and a processor configured to execute the stored one or more programs, wherein the processor is configured to: select a given preamble when receiving a synchronization signal block from a base station through the communication module, transmit, to the base station, a first message including the selected given preamble through the communication module by using sequential beam-sweeping, transmit a third message for a connection request for uplink data transmission through the communication module when receiving, from the base station, a second message responding to the transmitted first message, wherein the third message is transmitted using beam-switching; and complete a random access channel operation when receiving a fourth message responding to the transmitted third message, wherein the processor is configured to: determine a random beam sequence when receiving the second message from the base station, and transmit, to the base station, the third message for a connection request for the uplink data transmission through the communication module by using beam-switching using the determined random beam sequence.

11. The random access apparatus of claim 10,
wherein the processor is configured to determine a new random beam sequence to be used for beam-switching and to retransmit the third message through the communication module, when a collision occurs in the transmitted third message.

12. The random access apparatus of claim 11,
wherein the collision of the transmitted third message occurs because, if a plurality of user equipments (UEs) select an identical preamble and transmits the respective preambles to the base station, the base station recognizes the plurality of transmitted identical preambles as one preamble and the plurality of UEs receives one response message.

13. The random access apparatus of claim 10, wherein the selected given preamble has an orthogonal property and does not have a collision with another preamble transmitted at an identical timing by another UE.

14. The random access apparatus of claim 10, wherein the beam-switching using the random beam sequence includes avoiding a collision of the third message by separating times when UEs transmit the third messages through uplink beams.

15. The random access apparatus of claim 10,
wherein the processor is configured to adjust a number of beams to be used in the beam-switching based on a number of UEs deployed in a wireless network environment.

16. The random access apparatus of claim 10,
wherein the processor is configured to transmit the third message for a connection request for the uplink data transmission through the communication module when receiving, from the base station, the second message responding to the transmitted first message.

17. The random access apparatus of claim 10,
wherein the processor is configured to receive a resource allocated to transmit the third message through the second message received from the base station.

18. The random access apparatus of claim 10,
wherein the processor is configured to determine, as an uplink beam, a beam used when transmitting the third message, when receiving the fourth message responding to the transmitted third message.

* * * * *